(12) United States Patent
Shankarappa

(10) Patent No.: US 8,238,420 B1
(45) Date of Patent: Aug. 7, 2012

(54) VIDEO CONTENT TRANSCODING FOR MOBILE DEVICES

(75) Inventor: Pruthvish Shankarappa, Davis, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1232 days.

(21) Appl. No.: 12/019,259

(22) Filed: Jan. 24, 2008

(51) Int. Cl.
*H04N 7/44* (2006.01)

(52) U.S. Cl. .................................. 375/240.02
(58) Field of Classification Search .............. 375/240.02
See application file for complete search history.

(56) References Cited

U.S. PATENT DOCUMENTS

| | | | | |
|---|---|---|---|---|
| 5,847,703 | A * | 12/1998 | Teicher et al. | 725/56 |
| 6,282,240 | B1 | 8/2001 | Fukunaga et al. | |
| 6,457,057 | B1 * | 9/2002 | Kageyu et al. | 709/231 |
| 6,865,374 | B2 | 3/2005 | Kalluri | |
| 7,154,951 | B2 * | 12/2006 | Wang | 375/240.12 |
| 7,443,797 | B2 | 10/2008 | Cheung et al. | 370/236 |
| 7,558,760 | B2 * | 7/2009 | Fang et al. | 705/57 |
| 2002/0147980 | A1 * | 10/2002 | Satoda | 725/90 |
| 2008/0253690 | A1 * | 10/2008 | Askelof et al. | 382/295 |
| 2010/0094931 | A1 * | 4/2010 | Hosur et al. | 709/203 |

FOREIGN PATENT DOCUMENTS

WO WO2004/049719 10/2004

OTHER PUBLICATIONS

Lei, Zhijun et al., "Video Transcoding Gateway for Wireless Video Access." School of Information Technology and Engineering University of Ottawa, 2003, 4 pages.

Ling, Zi et al., "Adaptive Multi-Path Video Streaming." Ryerson University, Toronto, Ontario, Canada, 2006, 8 pages.

* cited by examiner

*Primary Examiner* — Huy D Vu
*Assistant Examiner* — Benjamin Lamont
(74) *Attorney, Agent, or Firm* — Fish & Richardson P.C.

(57) ABSTRACT

The present disclosure includes, among other things, systems, methods and program products for video transcoding. A request is received for first video content for a playback system where the first video content is encoded with a first number of i-frames, where first video content frames are a first frame size. A second number of i-frames is determined for the first video content based on one or more playback capabilities of the playback system, where the second number of i-frames is greater than the first number of i-frames. A second frame size is determined for the first video content based on the playback capabilities of the playback system, where the second frame size is smaller than the first frame size. The first video content is transcoded to second video content where the second video content has the second number of i-frames and frames of the second frame size.

21 Claims, 7 Drawing Sheets

VIDEO CONTENT TRANSCODING FOR MOBILE DEVICES

BACKGROUND

FIG. 1 is an example prior art system 100 for transmitting and playing back video content. The system 100 includes a video server 102 connected to a mobile device 104 and to a personal computer 106 (e.g., desktop computer), over one or more data communication networks 108. The network 108 can be one or more private or public, wired or wireless networks, such as the Internet, a LAN (Local Area Network), WAN (Wide Area Network), or some other type of network. The mobile device 104 can be a mobile phone, smart phone, personal digital assistant (PDA), Blackberry device, portable computer, electronic gaming device, media player, or combinations of these. Other types of mobile devices are possible.

The video server 102 receives requests for video content from, and sends video content to, the mobile device 104 and the personal computer 106. The devices 104 and 106 can present received video content on their respective displays. In general, the video server 102 can send video content to any playback system, where a playback system is a device or software capable of decoding and presenting the video content. By way of illustration, video content can include video, still images, audio content, vector graphics, non vector graphics, combinations of these, and other content that can be played back on a playback system. Examples of video content are movies, music videos, and television programs, to name a few.

The video server 102 can retrieve video content from a connected video repository 110. Video content can be stored and, optionally, transmitted in a compressed format, such as in an MPEG (Moving Picture Experts Group) format. The video repository 110, for a particular video title, can store either one version of video content scaled for a single display size or multiple versions where each version is scaled for different display sizes. For example, the video repository 110 includes video content items 112a-c, where each video content item is created for a different display size. For example, the video content item 112a is for devices with small displays, such as mobile device 104. Likewise, video content item 112c may be the same video title as 112a but for a larger display, such as typically found on the personal computer 106.

If multiple versions of video titles are stored for different display sizes, a number of issues can arise. First, the repository 110 can be required to store significantly more data than if only one version of each title is stored. Additionally, it is impractical for the video server 102 to store a version of each video title for every possible screen size. Potential screen sizes are numerous, and it would be impractical for the video server 102 to anticipate screen sizes for all possible requesting devices.

If only one version of a video title is stored in the repository 110, the video content can be scaled dynamically by the receiving device if video content is requested by a device whose screen size does not correspond to the scale of the stored video content. For example, if video content stored in the repository 110 is scaled to correspond to the screen size of the personal computer 106, and if a request for video content is received from the mobile device 104, the mobile device 104 can dynamically downscale the video content as the content is being received. Sending video content scaled for a screen size larger than is necessary, however, consumes extra communications bandwidth (resulting in transmission latency) and generally takes more time to decode than necessary.

Whether or not video content is pre-scaled for a mobile device's given display size, such devices generally have less powerful processors than personal computers and communicate over slower, less reliable wireless networks. Therefore, video content decoding on mobile devices can typically fall behind resulting in video playback being out of synchronization with audio playback. When this happens, some playback systems "drop" video frames in order to catch the video playback up to the audio playback. However, this can cause the presentation of video content to skip or jump which can be disconcerting to users.

SUMMARY

In general, one or more aspects of the subject matter described in this specification can be embodied in one or more methods that include receiving a request for first video content for a playback system where the first video content is encoded with a first number of i-frames and where first video content frames are a first frame size. A second number of i-frames is determined for the first video content based on one or more playback capabilities of the playback system and where the second number of i-frames is greater than the first number of i-frames. A second frame size is determined for the first video content based on the playback capabilities of the playback system and where the second frame size is smaller than the first frame size. And the first video content is transcoded to second video content where the second video content has the second number of i-frames and frames of the second frame size. Other embodiments of this aspect include corresponding systems, apparatus, and computer program products.

These and other embodiments can optionally include one or more of the following features. The second video content can be provided to the playback system. The second video content can be streamed to the playback system. Determining the second number of i-frames can be based on a video playback rate of the playback system. Determining the second number of i-frames can be based on a detected number of scene changes in the first video content. Transcoding the first video content can includes inserting an i-frame in the second video content at each of the detected scene changes. Determining the second frame size is based on a display size of the playback system. The first video content can be encoded with a first number of p-frames and where transcoding includes: determining a second number of p-frames for the first video content based on the playback capabilities of the playback system where the second number of p-frames is less than the first number of p-frames; and transcoding the first video content to the second video content such that the second video content has the second number of p-frames.

Particular implementations of the subject matter described in this specification can be implemented to realize one or more of the following advantages. Video content transcoding as described in this document can result in fewer dropped frames on playback systems as a result of inserting more i-frames and scaling video frames to the appropriate size for the playback system. The number of additional i-frames inserted can be adjusted dynamically in response to various factors, including the performance of the playback system and detection of scene changes. A p-frame can be replaced with a corresponding, newly transcoded frame, thereby reducing the amount of data to be transmitted.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
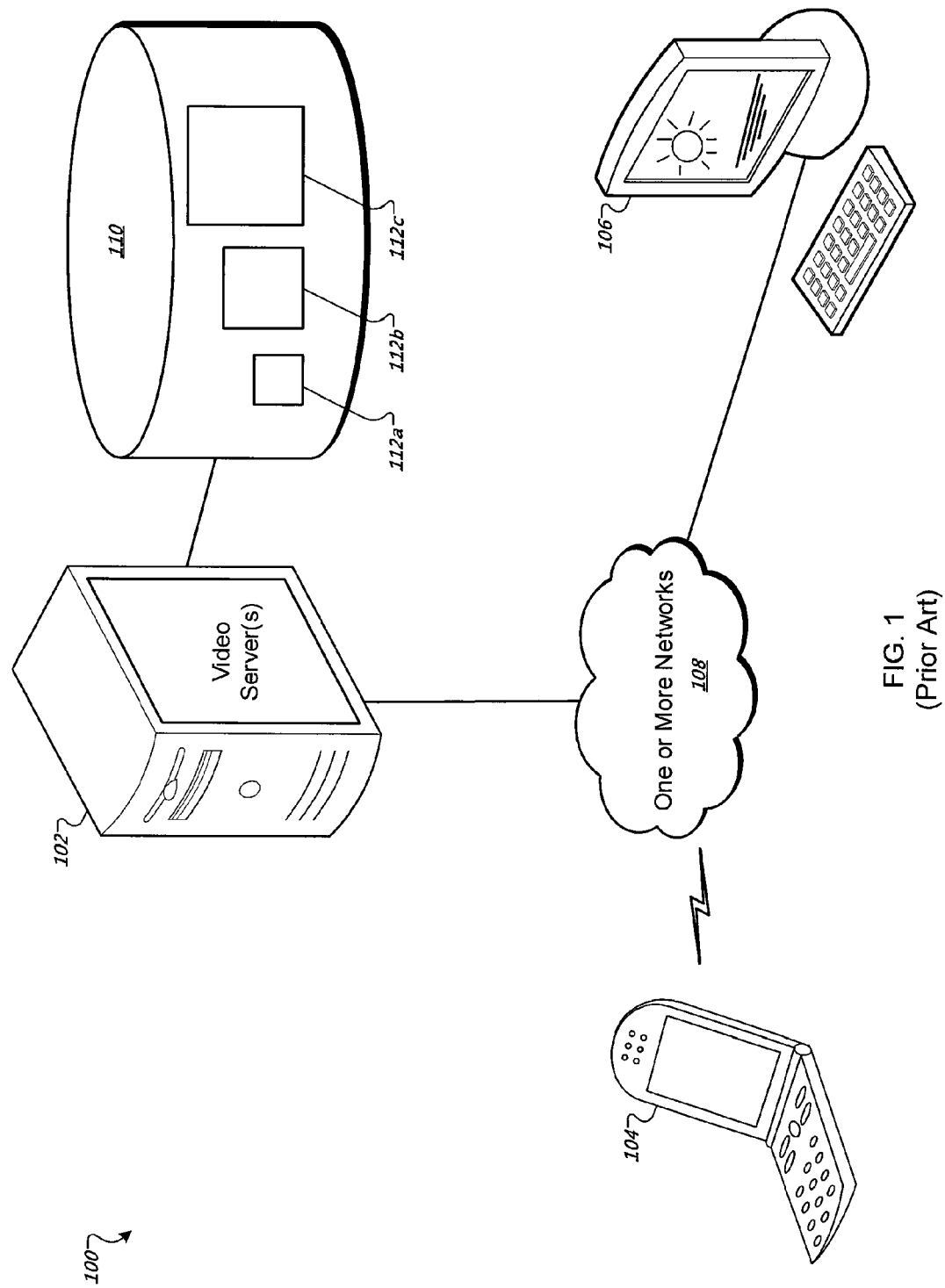
FIG. 1 is an example prior art system for transmitting and playing video content.
Figure 2:
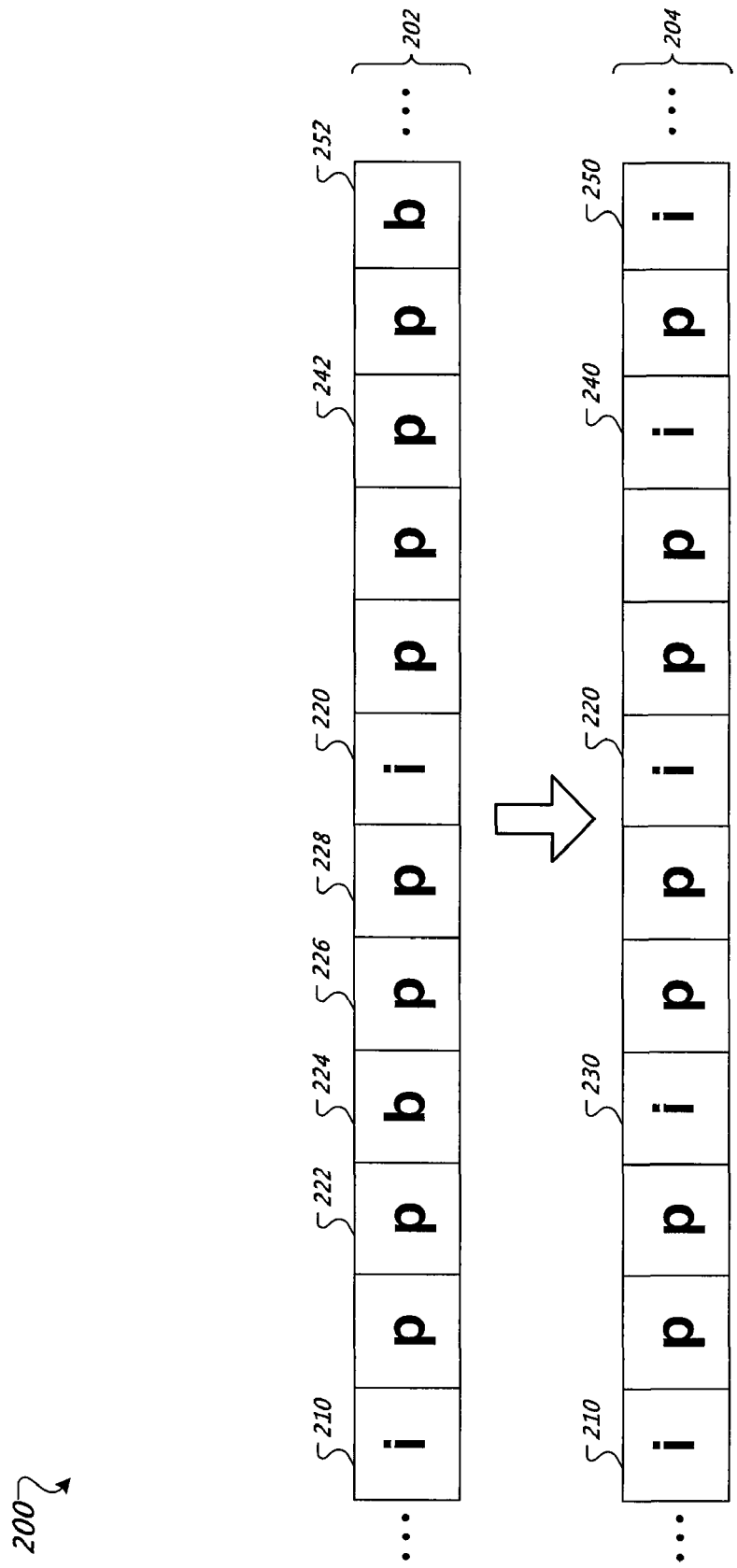
FIG. 2 illustrates sequences of video frames.

FIG. 2 illustrates sequences of video frames. As mentioned above, the mobile device 104 and the personal computer 106 are examples of video playback systems capable of decoding and playing back compressed (e.g., MPEG) video content. MPEG compression compresses video content to reduce the size of the content, resulting in less storage space and smaller communication bandwidth requirements. MPEG compression removes spatial redundancy within video frames and temporal redundancy between video frames. A video frame is a still image. In various implementations, a video playback system can play video content by decoding and displaying video frames at a specified playback rate of, for example, 30 frames per second.

In various implementations, video content is encoded using an MPEG encoding technique. In general, each video frame in a given video content is encoded as an MPEG frame type. An MPEG frame can be an intra-frame or "i-frame", a forward predicted frame or "p-frame", or a bi-directional predicted frame or "b-frame". I-frames have video frame image data coded without reference to any other video frames and are commonly used as random access points in video content for an MPEG decoder to begin decoding anew. P-frames are coded based on one or more previous video frames and can contain both image data and motion vector information. Generally speaking, a p-frame represents the differences between images in two consecutive video frames. Because the differences between two consecutive video frames are usually small due to their closeness in time (unless there is a scene change), p-frames can be represented with fewer bits than i-frames. Finally, a b-frame is encoded by storing change information relative to a following frame as well as to a preceding frame. Both b- and p-frames can be encoded relative to i-frames or relative to other b- and p-frames.

An MPEG encoder determines whether it is more efficient to code a given video frame as an i-frame, b-frame, or p-frame based on a number of factors. For example, sometimes encoding a video frame as a p-frame rather than as an i-frame is more efficient from a compression standpoint. However, if an i-frame becomes overly complex due to capturing a large number of changes between two video frames, it might be more efficient from a decoding standpoint for the encoder to code the video frame as an i-frame.

Encoded frames 202 and 204 represent portions of video content to be delivered to a playback system (e.g., the mobile device 104). As shown, the example video streams 202 and 204 include sequences of i-, b-, and p-frames. The video stream 202 includes a first i-frame at a position 210 and a second i-frame at a position 220. As described above, the i-frames at positions 210 and 220 are not dependent upon (i.e., not encoded relative to) other frames. In contrast, the p- and b-frames included in the video stream 202 are encoded relative to other frames. The p- and b-frames located between positions 210 and 220 (e.g., 222-228) are encoded, at least in part, relative to the i-frame at position 210. Similarly, the p- and b-frames located after position 220 are encoded, at least in part, relative to the i-frame located at position 220.

As described above, some playback systems, such as the mobile device 104, may have to drop frames in order to "catch up" and synchronize video playback with audio playback. When a playback system has determined that audio and video are unsynchronized, the playback system can skip over frames (instead of decoding them) until an i-frame is encountered that would put the video decoding in sync with the audio decoding. For example, if a playback system determines that audio and video are unsynchronized while decoding the frame at position 222, the frames 222-228 can be skipped. Thereafter, the playback system can continue to decode and display subsequent frames. However, skipping frames can cause visible jumps in the video playback.

In various implementations, if additional i-frames are inserted into video content (e.g., in lieu of p- or b-frames), a playback system that is trying to resynchronize will generally have to skip fewer p- and b-frames in order to encounter an i-frame for synchronization, since the i-frames occur more frequently. This can result in smoother video playback since fewer frames are dropped. For example, the video stream 204 illustrates a modification to the video stream 202 resulting from the insertion of i-frames at positions 230, 240, and 250 (i.e., the b-frame at position 224 has been replaced with the i-frame at position 230, the p-frame at position 242 has been replaced with the i-frame at position 240, and the b-frame at position 252 has been replaced with the i-frame at position 250). The insertion of additional i-frames results in a larger number of access points were the playback system can resume playback after resynchronization of audio and video playback.

In various implementations, the insertion of additional i-frames can be based on a playback rate of the playback system. A playback rate indicates how well a playback system performs in decoding video, indicating what percentage of video frames are decoded and displayed (i.e., not skipped) for a given time period. For example, a playback rate of 100% could indicate that a playback system never skips any video frames. As another example, a playback rate of 80% could indicate that the playback system decodes and plays 80% of the received video frames, but has to, on average, drop 20% of the received video frames in order to decode video fast enough to keep up with audio decoding. In general, the larger the playback rate, the fewer the number of additional i-frames that need to be inserted. Conversely, the lower the playback rate, the higher the number of i-frames that need to be inserted. In some implementations, a playback rate at or near 100% would result in no additional i-frames being inserted, since the playback system is not dropping any frames. More i-frames may be inserted for a playback system with a playback rate of 70% than for a playback system with a playback rate of 80%, for instance. In general, mobile devices may have playback rates less than 100% due to their relatively slow processors and sluggish, error-prone wireless networks.

In a further implementation, the insertion of additional i-frames can be based on the quality of service for one or more networks that are used to transmit video content to a given playback system, where the quality of service can be a measure of bandwidth, error rate, latency, knowledge of network protocols and physical layer protocols being used, combinations of these, or other measures of network performance. For example, if the latency of a network or error rate is high, more i-frames can be inserted since it is likely that some encoded frames may not be received by a playback system in time to keep video decoding in synchronization with audio decoding which will result in the playback system needing to drop frames and skip ahead to the next i-frame.

In yet a further implementation, the insertion of additional i-frames can be based on knowledge of the playback system's host environment, such as a device's processor speed, processing abilities, host operating system, device model number, hardware profile, software version, display size, remaining battery power, signal strength, processes running on the device or other measure of system latency, combinations of these, and other characteristics of the playback system's environment. Other ways of determining when to insert additional i-frames are possible.

Figure 3:
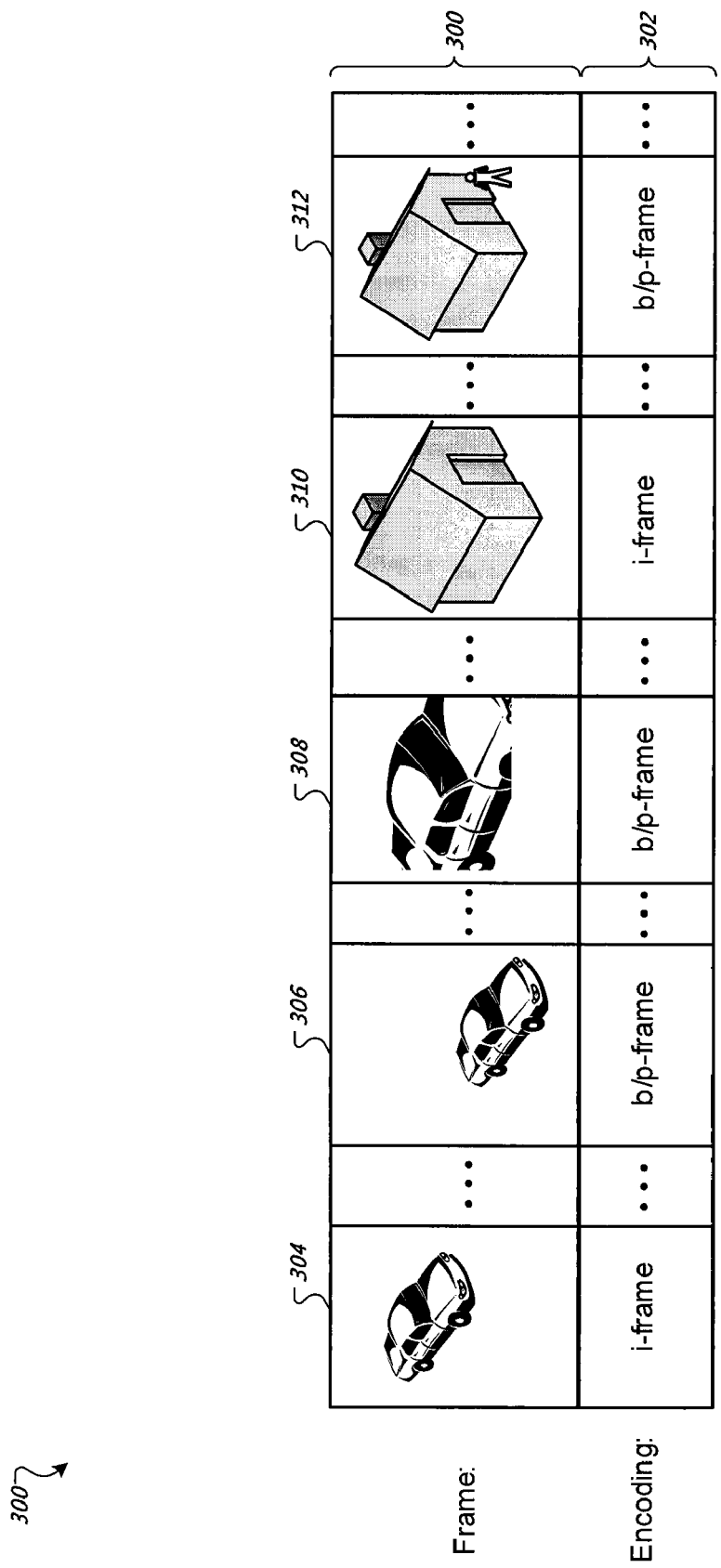
FIG. 3 illustrates scene changes in video content.

FIG. 3 illustrates scene changes in video content. Cinematically speaking, a scene change arises from the editing processing in which action in different scenes is spliced together for dramatic effect. From an MPEG encoding standpoint, the differences between the video frame that occurs just before the scene change and the video frame that occurs just after may be so great as to negate the benefit of encoding the later frame as a p- or b-frame. For example, the differences between frames 304, 306 and 308 are not as great as the differences between frames 308 and 310, where a scene change occurs. This tips the balance in favor of encoding frame 310 as an i-frame rather than a p- or b-frame.

There are other types of editing that result in more subtle types of changes between frames which may or may not cause an MPEG encoder to insert i-frames such as zooming in or out of a shot, cutting to a close-up shot, or changing the angle of a shot, for example. For purposes of this document, we refer to this type of editing as scene changes as well. Representing these scene changes as i-frames instead of as p- or b-frames can create more access points within video content for a playback system to jump to if video and audio become unsynchronized. And a jump to a scene change may appear to a user as a normal editing change and would not appear as a result of skipped frames, for example.

FIG. 3 illustrates a sequence of video frames 300, with associated frame types 302 for each video frame. For example, a frame 304 displaying a car is encoded as an i-frame. A frame 306 displaying the car in a different location is encoded as either a b- or p-frame. A frame 308 displaying a close-up of the car is encoded as a p-frame. Frame 308 can instead be represented as an i-frame, to create another access point within the video stream. A frame 310, which represents a subject-matter scene change, is encoded as an i-frame (and would most likely be encoded as an i-frame in regular MPEG compression). If, however, for some reason the frame 310 was originally encoded as a b- or p-frame, the frame encoding can be changed to be an i-frame. A frame 312, which shows a relatively small change from the frame 310, can be encoded as a b- or p-frame.

Figure 4:
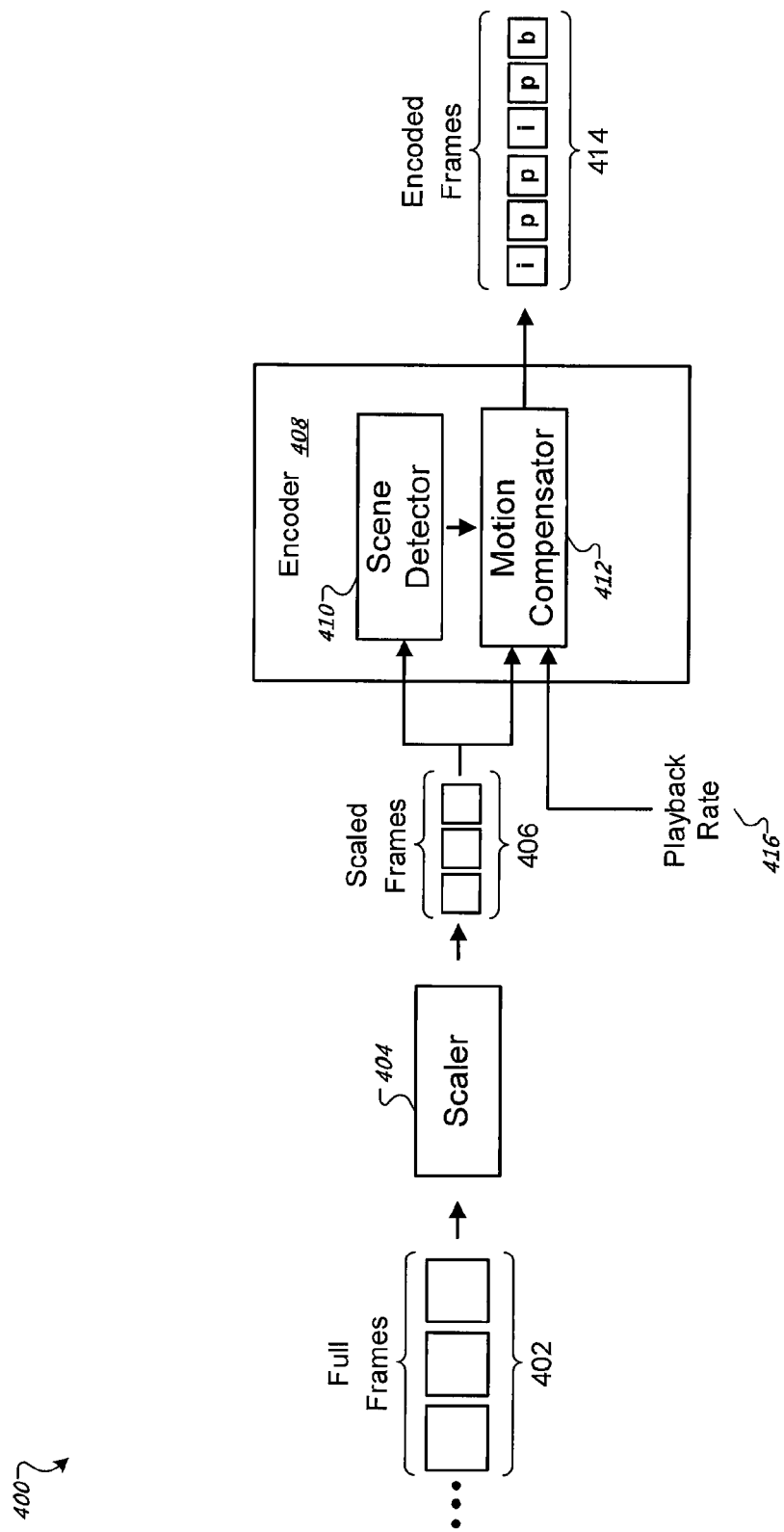
FIG. 4 illustrates an example modified MPEG encoding system.

FIG. 4 illustrates an example modified MPEG encoding system 400. The encoding system 400 can be included, for example, in the video server 102 to transcode video content on the fly, or can be part of a system which interfaces with the video server 102 and a playback system. The encoding system 400 can serve modified encoded video content to a playback system, for instance. A sequence of video frames 402 is received as input to a scaler component 404. The full frames 402 can be produced, for example, by decoding, or playing back compressed MPEG video content. An optional scaler component 404 produces scaled video frames 406. For example, the scaled frames 406 can be scaled-down (or scaled-up) versions of the full frames 402, sized to an appropriate size to be displayed on the mobile device 104. See FIG. 5 for an illustration of scaled frames. The scaled frames 406 are sent to an encoder 408. The encoder 408 includes an optional scene detector 410 and a motion compensator 412. The encoder 408 produces encoded frames 414 which can be sent (e.g., streamed) to a playback system (e.g., mobile device 104).

The motion compensator 412 performs motion compensation which in general involves encoding a given video frame with reference to one or more other video frames. Block motion compensation involves encoding predicted blocks based on blocks of adjacent reference frames. A block is a portion of a frame. A frame can be divided into a grid of 16 by 16 blocks, called macro blocks. Blocks can be all the same size or can be variably sized within a frame. Blocks can also be overlapped. Variable-sized and overlapped blocks can help to limit image distortion due to discontinuities on block borders. Block motion compensation can represent translation of blocks between frames using motion vectors.

The encoded frames 414 include additional i-frames based on scene changes detected by the scene detector 410 and by additional i-frames inserted by the motion compensator 412. In some implementations, the scene detector 410 instructs the motion compensator to insert an i-frame at scene-change points within video content where an i-frame might otherwise not have been inserted (as described above with respect to FIG. 3). The number of i-frames inserted can also be based on a playback rate 416, or other bases as described above, which can be received as input to the encoder 408 (e.g., the playback rate 416 can be received from the playback system). If the received playback rate 416 is less than 100%, for example, the motion compensator 412 can insert more i-frames than would normally be inserted using normal MPEG compression. The lower the playback rate 416, the higher the number of additional i-frames that will be inserted. The higher the playback rate 416, the lower the number of i-frames that will be inserted.

Figure 5:
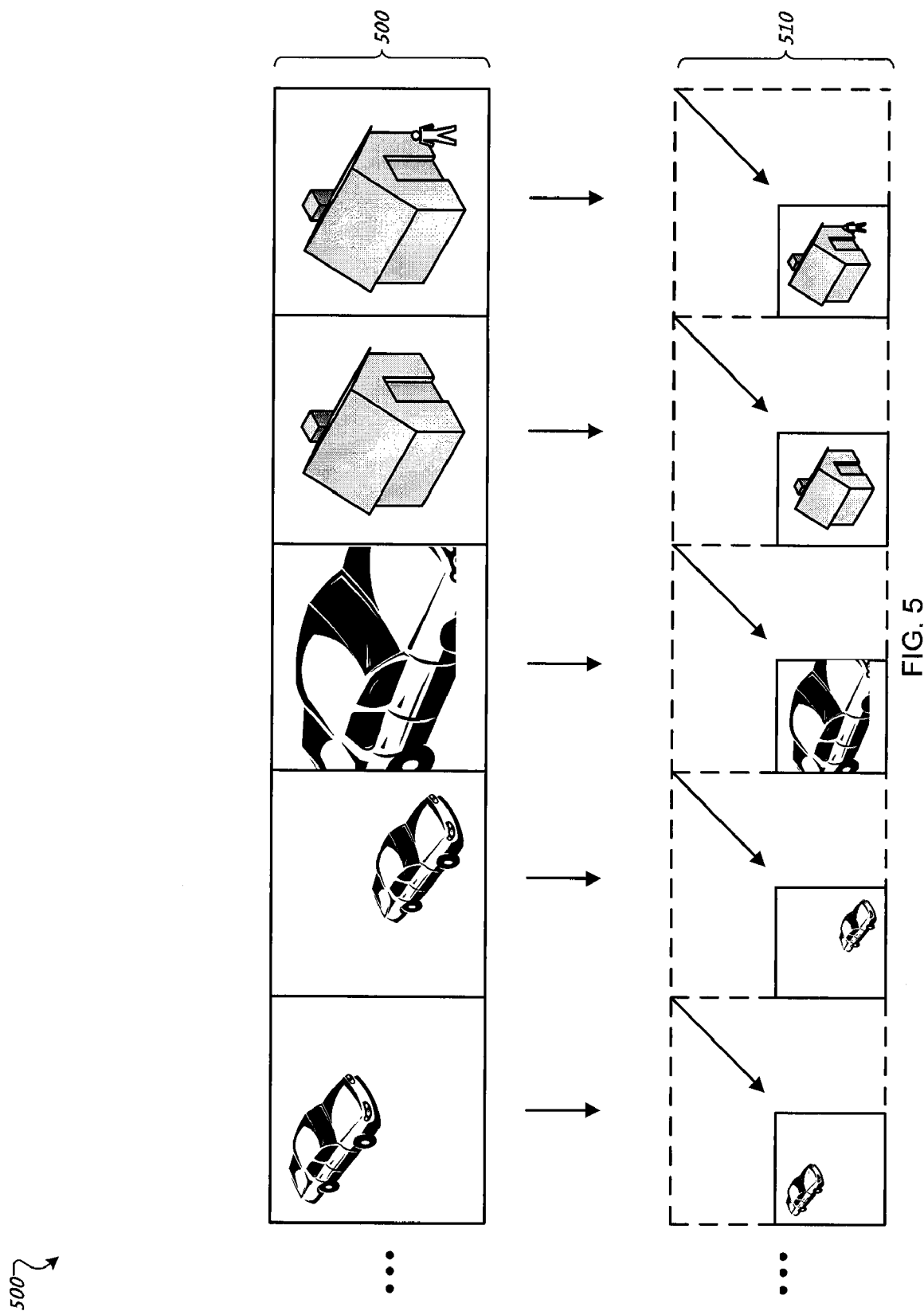
FIG. 5 illustrates scaled video frames.

FIG. 5 illustrates scaled video frames. A sequence 500 of full-sized frames can be scaled (e.g., by the scaler 404) to produce a sequence 510 of scaled frames. Each frame in the sequence 510 is a scaled version of the corresponding frame in the sequence 500. The sequence 510 consumes potentially significantly less space than the sequence 500. The space savings acquired due to scaling can be used for insertion of additional i-frames. Although i-frames consume more space than other frame types, downscaled i-frames (e.g., downscaled to a mobile device screen size) can consume considerably less space than the corresponding unscaled frame.

Figure 6:
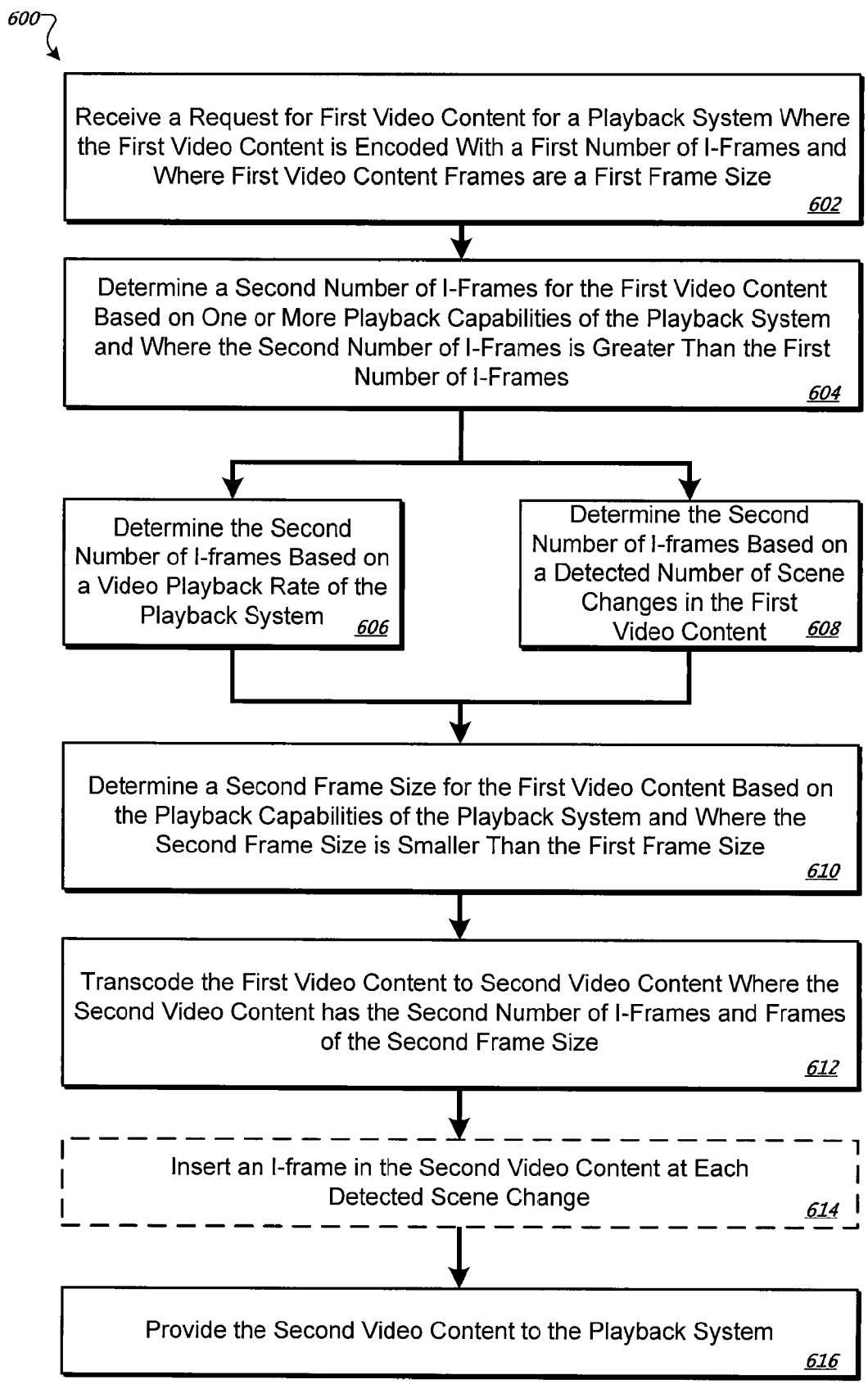
FIG. 6 is a flowchart illustrating a process for transcoding video content.

FIG. 6 is a flowchart illustrating a process 600 for transcoding video content. A request for first video content for a playback system is received, where the first video content is encoded with a first number of i-frames and where first video content frames are a first frame size (step 602). For example, a request for video content can be received from a video server. The sequence of first video content can be retrieved, for example, from a repository. A second number of i-frames for the first video content is then determined based on one or more playback capabilities of the playback system and where the second number of i-frames is greater than the first number of i-frames (step 604). The second number of i-frames is determined based on a video playback rate of the playback system (step 606) and/or scene changes in the first video content (step 608). A second frame size for the first video content is then determined based on the playback capabilities of the playback system and where the second frame size is smaller than the first frame size (step 610). For example, a frame size can be determined based on the screen size of the mobile device 104.

The first video content is then transcoded to second video content, where the second video content has the second number of i-frames and video frames of the second frame size (step 612). The transcoding includes optionally inserting an i-frame in the second video content at each detected scene change (step 614). For example, i-frames can be inserted into the video sequence 202 based on scene changes detected by the scene detector 410. Next, the second video content is provided to the playback system (step 616). For example, video content can be streamed to the mobile device 104 across the network 108 or sent as one or more files.

Figure 7:
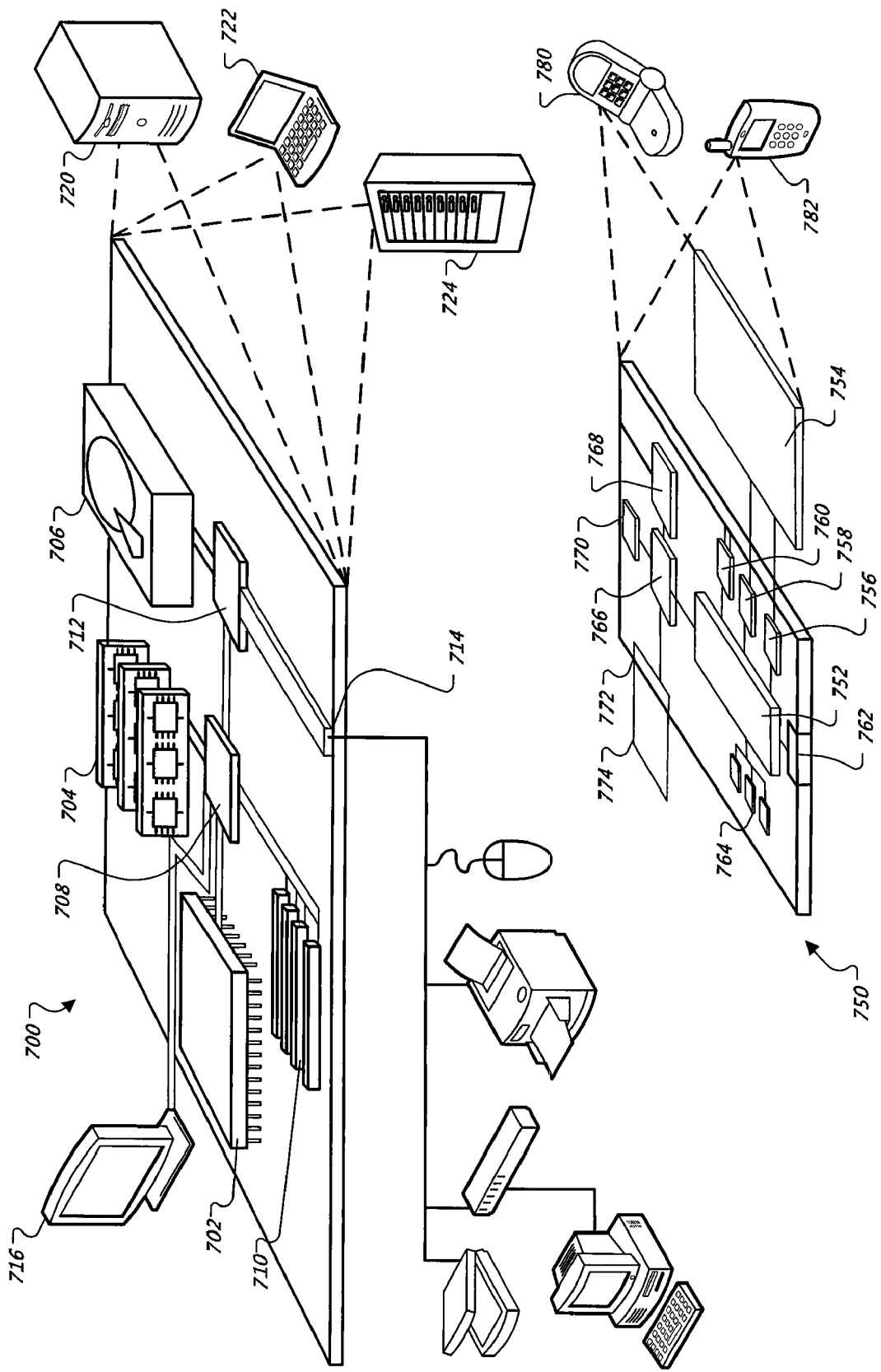
FIG. 7 is a block diagram of computing devices.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. For example, computing device 700 can represent the personal computer 106. Computing device 750 is intended to represent various forms of mobile devices, such as personal digital assistants, cellular telephones, smartphones, and other similar computing devices. For example, the computing device 750 can represent the mobile device 104. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. For example, the processor 702 can execute instructions for encoding and decoding video. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. For example, the storage device 706 can store the repository 110. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:
1. A computer-implemented method, comprising:
  receiving a request for first video content for a playback system where the first video content is encoded with a first number of i-frames, where first video content frames are a first frame size;

receiving a current playback error rate regarding the playback system;

determining a second number of i-frames for the first video content based on one or more playback capabilities of the playback system and on the current playback error rate, where the second number of i-frames is greater than the first number of i-frames;

determining a second frame size for the first video content based on the playback capabilities of the playback system, where the second frame size is smaller than the first frame size; and transcoding the first video content to second video content where the second video content has the second number of i-frames and frames of the second frame size, wherein the transcoding generates a space saving, and wherein the second number of i-frames is determined so that the space saving is used for increasing the first number of i-frames to the second number of i-frames.

2. The method of claim 1, further comprising:
streaming the second video content to the playback system.

3. The method of claim 1 where determining the second number of i-frames is based on a detected number of scene changes in the first video content.

4. The method of claim 3 where transcoding the first video content includes:
inserting an i-frame in the second video content at each of the detected scene changes.

5. The method of claim 1 where determining the second frame size is based on a display size of the playback system.

6. The method of claim 1 where the first video content is encoded with a first number of p-frames and where transcoding includes:
determining a second number of p-frames for the first video content based on the playback capabilities of the playback system where the second number of p-frames is less than the first number of p-frames; and
transcoding the first video content to the second video content such that the second video content has the second number of p-frames.

7. The method of claim 1, further comprising dynamically adjusting the second number of i-frames based at least in part on a new current playback error rate regarding the playback system.

8. A computer program product, encoded on a non-transitory computer-readable medium, operable to cause one or more processors to perform operations comprising:
receiving a request for first video content for a playback system where the first video content is encoded with a first number of i-frames, where first video content frames are a first frame size;

receiving a current playback error rate regarding the playback system;

determining a second number of i-frames for the first video content based on one or more playback capabilities of the playback system and on the current playback error rate, where the second number of i-frames is greater than the first number of i-frames;

determining a second frame size for the first video content based on the playback capabilities of the playback system, where the second frame size is smaller than the first frame size; and transcoding the first video content to second video content where the second video content has the second number of i-frames and frames of the second frame size, wherein the transcoding generates a space saving, and wherein the second number of i-frames is determined so that the space saving is used for increasing the first number of i-frames to the second number of i-frames.

9. The program product of claim 8, wherein the operations further comprise:
streaming the second video content to the playback system.

10. The program product of claim 8 where determining the second number of i-frames is based on a detected number of scene changes in the first video content.

11. The program product of claim 10 where transcoding the first video content includes:
inserting an i-frame in the second video content at each of the detected scene changes.

12. The program product of claim 8 where determining the second frame size is based on a display size of the playback system.

13. The program product of claim 8 where the first video content is encoded with a first number of p-frames and where transcoding includes:
determining a second number of p-frames for the first video content based on the playback capabilities of the playback system where the second number of p-frames is less than the first number of p-frames; and
transcoding the first video content to the second video content such that the second video content has the second number of p-frames.

14. The program product of claim 8, wherein the operations further comprise dynamically adjusting the second number of i-frames based at least in part on a new current playback error rate regarding the playback system.

15. A system comprising:
machine-readable storage device including a program product; and
one or more processors operable to execute the program product, interact with the display device, and perform operations comprising:
receiving a request for first video content for a playback system where the first video content is encoded with a first number of i-frames, where first video content frames are a first frame size;
receiving a current playback error rate regarding the playback system;
determining a second number of i-frames for the first video content based on one or more playback capabilities of the playback system and on the current playback error rate, where the second number of i-frames is greater than the first number of i-frames;
determining a second frame size for the first video content based on the playback capabilities of the playback system, where the second frame size is smaller than the first frame size; and
transcoding the first video content to second video content where the second video content has the second number of i-frames and frames of the second frame size, wherein the transcoding generates a space saving, and wherein the second number of i-frames is determined so that the space saving is used for increasing the first number of i-frames to the second number of i-frames.

16. The system of claim 15, wherein the operations further comprise:
streaming the second video content to the playback system.

17. The system of claim 15 where determining the second number of i-frames is based on a detected number of scene changes in the first video content.

18. The system of claim 17 where transcoding the first video content includes:

inserting an i-frame in the second video content at each of the detected scene changes.

19. The system of claim 15 where determining the second frame size is based on a display size of the playback system.

20. The system of claim 15 where the first video content is encoded with a first number of p-frames and where transcoding includes:

determining a second number of p-frames for the first video content based on the playback capabilities of the playback system where the second number of p-frames is less than the first number of p-frames; and transcoding the first video content to the second video content such that the second video content has the second number of p-frames.

21. The system of claim 15, wherein the operations further comprise dynamically adjusting the second number of i-frames based at least in part on a new current playback error rate regarding the playback system.

* * * * *